United States Patent [19]
Miyazaki

[11] Patent Number: 5,587,800
[45] Date of Patent: Dec. 24, 1996

[54] IMAGE PROCESSING METHOD AND APPARATUS

[75] Inventor: Yuki Miyazaki, Kawasaki, Japan

[73] Assignee: Canon Kabushiki Kaisha, Tokyo, Japan

[21] Appl. No.: 405,377

[22] Filed: Mar. 15, 1995

Related U.S. Application Data

[63] Continuation-in-part of Ser. No. 7,103, Jan. 21, 1993, abandoned.

[30] Foreign Application Priority Data

Jan. 29, 1992 [JP] Japan .................... 4-013631
Jan. 13, 1993 [JP] Japan .................... 5-003918

[51] Int. Cl.⁶ .................................................. H04N 1/21
[52] U.S. Cl. .................................. 358/296; 347/247
[58] Field of Search ................................ 347/247, 251, 347/237, 131, 132; 358/296, 300, 302, 400, 401

[56] References Cited

U.S. PATENT DOCUMENTS 4,942,541 7/1990 Hoel et al. ................... 364/519
5,175,632 12/1992 Hayashi et al. ................ 358/401

FOREIGN PATENT DOCUMENTS

| 397200 | 11/1990 | European Pat. Off. | G06K 15/02 |
| 398681 | 11/1990 | European Pat. Off. | G06K 15/02 |
| 457534 | 11/1991 | European Pat. Off. | G06K 9/68 |
| 3633613 | 4/1987 | Germany | G06K 15/00 |
| 2182471 | 5/1987 | United Kingdom | G06K 15/10 |
| 2218233 | 11/1989 | United Kingdom | G06K 15/10 |

Primary Examiner—Mark J. Reinhart
Attorney, Agent, or Firm—Fitzpatrick Cella Harper & Scinto

[57] ABSTRACT

A fast-output image processing method and apparatus which employ an outline font. A page printer embodying the present invention stores form data received from a host computer into a RAM before printing output. Upon mapping of the input code data, examination is made as to whether the necessary pattern is stored in a cache memory or not, and if it is not stored, the pattern is registered. As for form data, similar pattern registration is performed to a cache memory for form character. The pattern registration is repeated until data for one page is mapped. In the case where the respective cache memories are full, the pattern of the lowest access frequency among registered patterns is deleted, thus realizing effective use of cache memories.

33 Claims, 9 Drawing Sheets

FIG. 2A

SALES PRICE

| ITEM | UNIT PRICE | MINIMUM ORDER ( ) |
|------|------------|-------------------|
|      |            |                   |
|      |            |                   |
|      |            |                   |
|      |            |                   |
|      |            |                   |
|      |            |                   |
|      |            |                   |
|      |            |                   |
|      |            |                   |

FIG. 2B

| | | |
|---|---|---|
| PENCIL | 30 | 13 |
| BINDER A | 400 | 5 |
| BINDER B | 600 | 5 |
| BALL-POINT PEN | 100 | 12 |
| ERASER | 50 | 6 |
| SCALE | 200 | 1 |
| NOTEBOOK A | 100 | 6 |
| NOTEBOOK B | 200 | 6 |
| ENVELOPE A | 60 | 12 |
| ENVELOPE B | 100 | 12 |
| ENVELOPE C | 200 | 12 |

FIG. 3A

SALES PRICE
ITEM
UNIT PRICE
MINIMUM ORDER

| | | |
|---|---|---|
| PENCIL | 30 | 12 |
| BINDER A | | |
| BINDER B | 4 | 5 |
| BALL-POINT PEN | | |
| ERASER | 6 | |
| SCALE | 1 | |
| NOTEBOOK | | |
| ENVELOPE C | | |

FORM CHARACTER CACHE MEMORY

| SALES PRICE | ITEM |
| UNIT PRICE | MIMIMUM ORDER |

ORDINARY CHARACTER CACHE MEMORY

PENCEL 30 6 12
BINDER A 4 1 5
BINDER B
BALL-POINT PEN
ERASER
SCALE
NOTEBOOK
ENVELOPE C

IMAGE PROCESSING METHOD AND APPARATUS

This application is a continuation of application Ser. No. 08/007,103 filed Jan. 21, 1993, now abandoned.

BACKGROUND OF THE INVENTION

The present invention relates to an image processing method and apparatus, and more particularly, to an image processing method and apparatus having a function where data received from a host computer is overlaid on a pre-registered standardized form to generate new image data.

Recently, outline fonts have been widely employed as a font in order to generate character pattern corresponding to character code data.

Main features of the outline font include easiness of character processing and fineness of the generated character pattern. However, there is a drawback that the time required to generate a character pattern employing the outline font is longer than that taken in a method employing a dotted pattern font. In order to reduce the processing time, a once-generated character pattern as a dot-pattern is registered in a cache memory for the next usage. When the same code is inputted, the registered character pattern is read out of the cache memory. In this manner, time for generating the dot character pattern is saved.

The above method controls available spaces in the cache memory in accordance with access frequencies of the registered character patterns. More specifically, when the cache memory becomes full, one character pattern of the lowest access frequency is deleted to create an available space for registration of a new character pattern.

However, in a case where an inputted data has to be overlaid on pre-registered form data and the overlaid image is outputted, the above-mentioned conventional approach has dealt with all the data without consideration of the type of data such as an ordinary character data or character data for a form. In many cases, when the cache memory becomes full, character data for a form might be deleted from the memory first because appearance frequency of the form character data is different from that of an ordinary character data. Thereafter, a deleted form character pattern must be read into the cache memory again upon form output. For example, a page printer employing the outline font rereads a once-deleted form character data into its cache memory and generates a dot patten, which takes much more time in dot pattern formation at every page, increasing processing time by final image formation.

SUMMARY OF THE INVENTION

The present invention has been made in consideration of the above situation, and has as its object to provide an image processing method capable of reducing the processing time upon overlaying an image on a pre-registered form image, and capable of fast outputting of the overlaid image.

According to the present invention, the foregoing object is attained by providing an image processing method of forming a new image by overlaying an image based on inputted data on a standardized form image which has been pre-registered, comprising an input step of inputting data corresponding to the image overlaid on the form, a first discrimination step of discriminating whether or not pattern data corresponding to the data inputted in the input step is stored in a first area of a recording medium, a first mapping step of mapping the input data in the first area using an outline font based on the discrimination result in the first discrimination step, a second discrimination step of discriminating whether or not pattern data included in the form is stored in a second area of the recording medium, a second mapping step of mapping the form in the second area using an outline font based on the discrimination result in the second discrimination step, a third mapping step of bitmapping the patterns mapped in said first and second mapping steps in a bitmap memory, and an output step of outputting the bitmapped pattern.

In accordance with the present invention as described above, examination is made to whether the pattern data corresponding to an input data is stored in the first area of the storage medium, and based on the examination result, the corresponding pattern data is generated using an outline font and outputted into the first area. Next, examination is made as to whether pattern data corresponding to a form is stored in the second area of the storage medium and based on the examination result, corresponding pattern data is generated using the outline font and outputted into the second area. The pattern data in the first and second areas are bit-mapped and outputted.

It is another object of the present invention to provide an image processing apparatus which can reduce output time upon overlaying an image on a pre-registered form and can output the overlaid image fast.

According to the present invention, the foregoing object is attained by providing an image processing apparatus having a facility of forming a new image by overlaying an image based on inputted data on a standardized form image, which has been pre-registered, comprising forming means for forming pattern data corresponding to code data included in the input data and the form using an outline font, first memory means for storing the pattern data corresponding to the code data included in the input data, first discrimination means for discriminating whether or not the pattern data corresponding to the code data included in the input data is stored in the first memory means, second memory means for storing the pattern data corresponding to the code data included in the form, second discrimination means for discriminating whether or not the pattern data corresponding to the code data included in the form is stored in the second memory means, and image forming means for forming an image using the pattern data.

In accordance with the present invention as described above, examination is made as to whether pattern data corresponding to code data included in an input data and a form is stored in the first and second areas. If the data is not stored, the corresponding pattern data are generated and stored in the first and second storage means, and an image based on the input data and the form is made.

The invention is particularly advantageous since the apparatus can save processing time for forming an image by overlaying an input image on a pre-registered form and it can output the overlaid image fast.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invent ion.

DETAILED DESCRIPTION OF THE PREFERRED EMBODIMENTS

Preferred embodiments of the present invention will be described in detail in accordance with the accompanying drawings.

A printing apparatus which receives a data from a host computer and overlays an ordinary character data on a form to output the overlaid image data will be described in detail below.

<Configuration of Apparatus (FIG. 1)>

Figure 1:
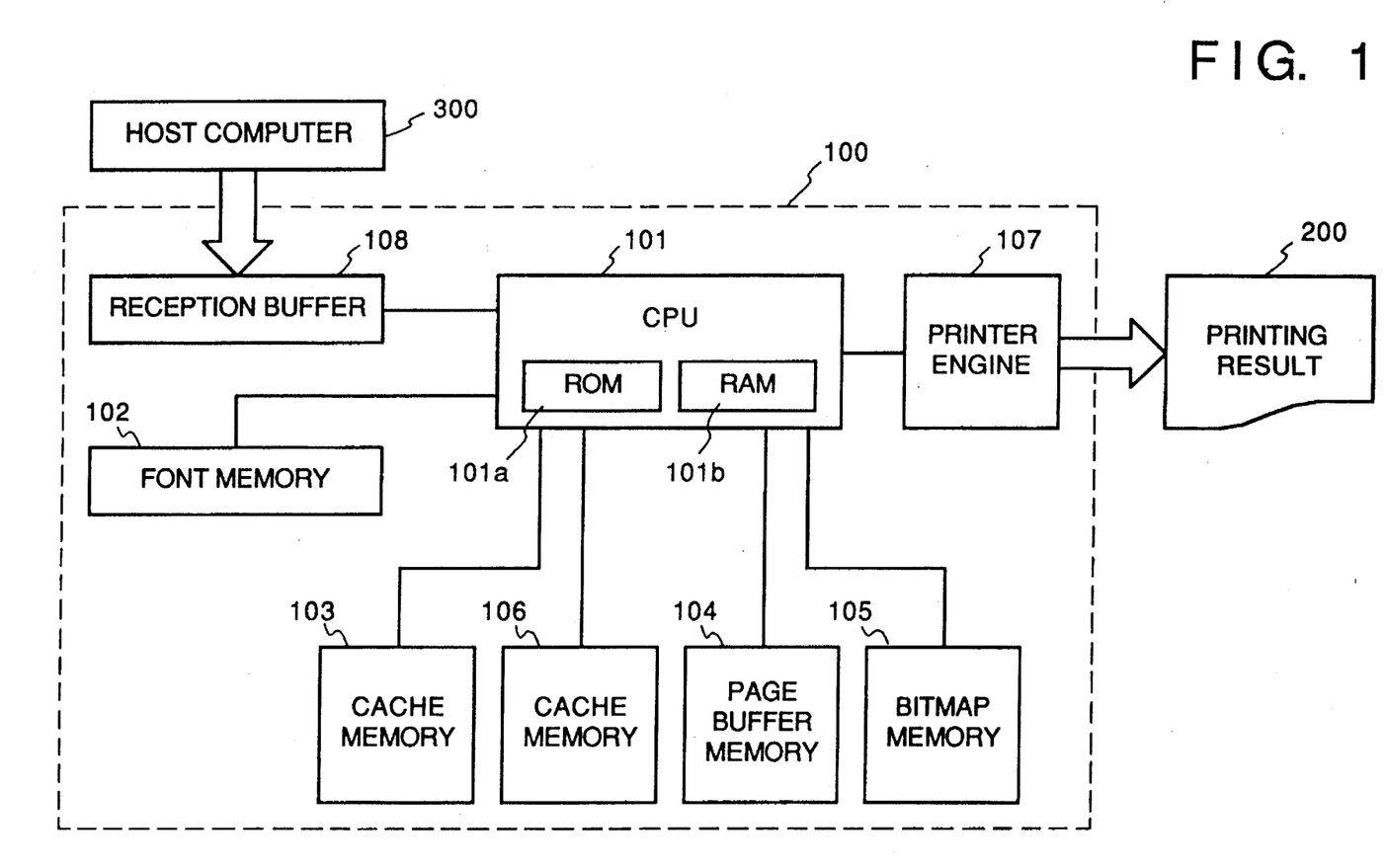
FIG. 1 is a block diagram showing a configuration of a printing apparatus as a typical embodiment of the present invention.

FIG. 1 shows a configuration of an printing apparatus according to an embodiment.

In FIG. 1, reference numeral 100 denotes a printer; 200, a printing result; and 300, a host computer which outputs printing data.

The printer 100 includes a CPU 101 having a ROM 101a and a RAM 101b and the following elements.

Reference numeral 108 denotes a reception buffer in which data from the host computer 300 is temporarily stored; 102, a font memory in which outline font data is stored; 103, a cache memory for form character data; 106, a cache memory for ordinary character data; 104, a page buffer memory in which received data is stored; 105, a bitmap memory for bitmapping of an image data for one page; and 107, a printer engine for actual printing process based on an image data bitmapped in the bitmap memory 105.

<Character Data (FIGS. 2A to 3B)>

Figure 2A:
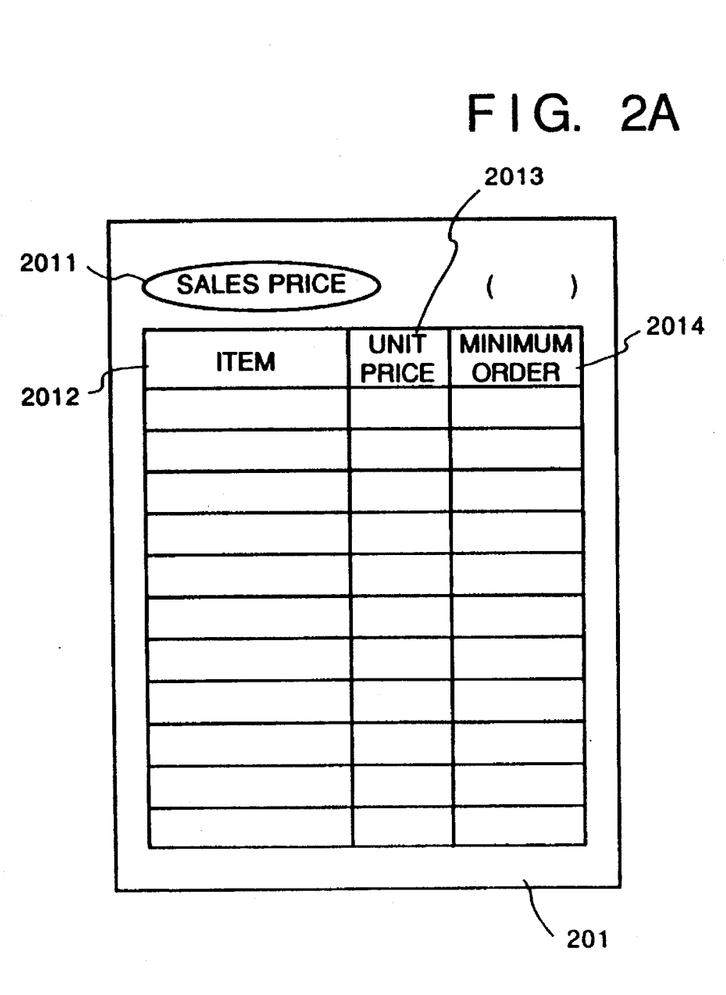
FIGS. 2A and 2B are diagrams showing examples of output data.
Figure 2B:
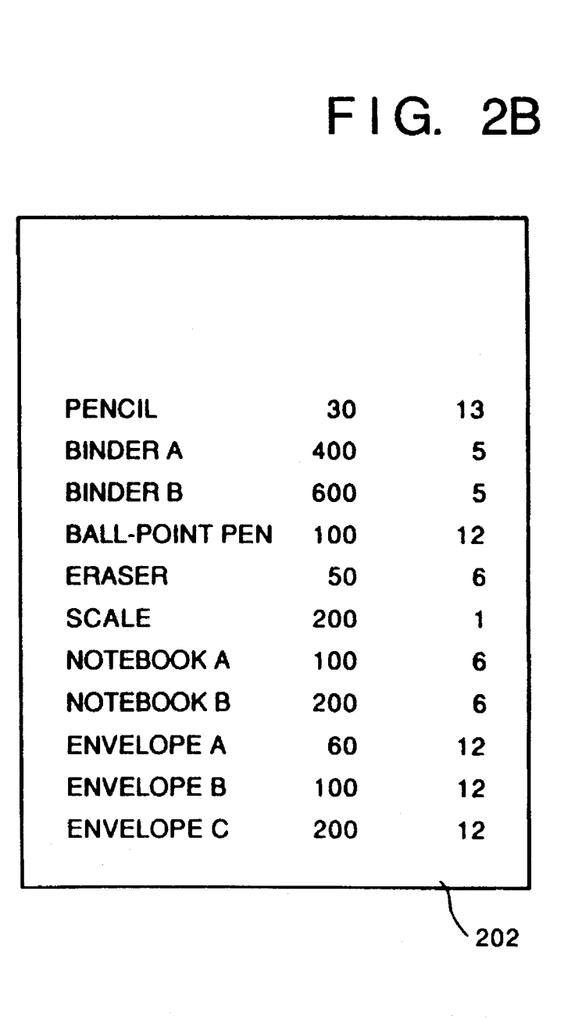

FIGS. 2A and 2B illustrate examples of data to be outputted by the printing apparatus according to the embodiment. In FIGS. 2A and 2B, reference numeral 201 denotes a form data; and 202, an ordinary character data. Upon printing output, the ordinary character data 202 is overlaid on the form data 201 to form an output image data. In the form data 201, numeral 2011 to 2014 denote character data in the form.

Figure 3A:
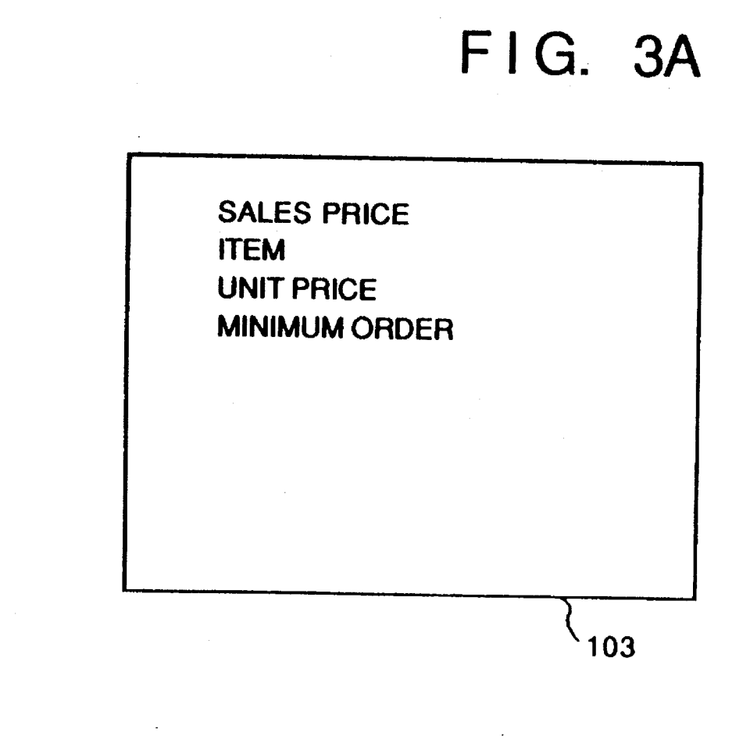
FIGS. 3A and 3B are diagrams showing data stored in cache memories according to the embodiment.
Figure 3B:
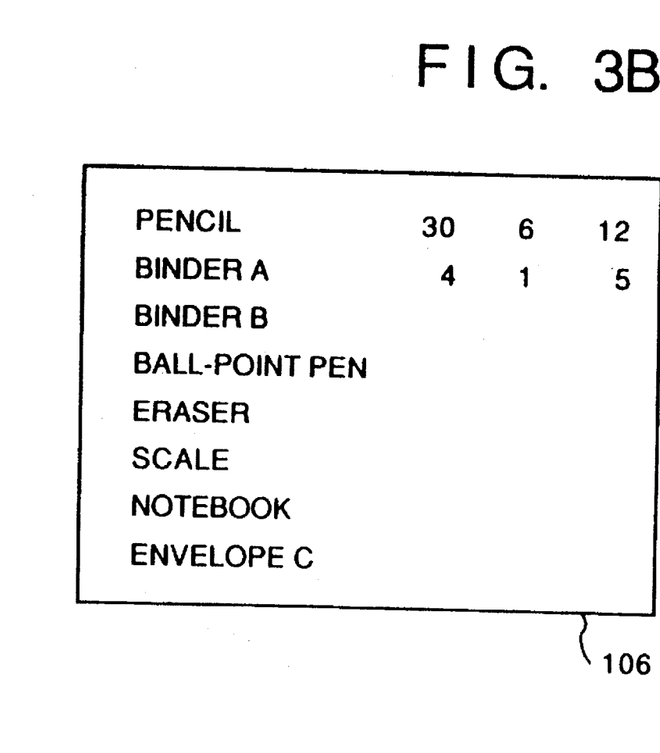

FIGS. 3A and 3B illustrate character patterns registered in the cache memory 103 for form character data and the cache memory 106 for ordinary character data in a case where the ordinary character data 202 is overlaid on the form data 201 and the overlaid image is outputted.

<Flowcharts (FIGS. 4 to 6)>

Figure 4:
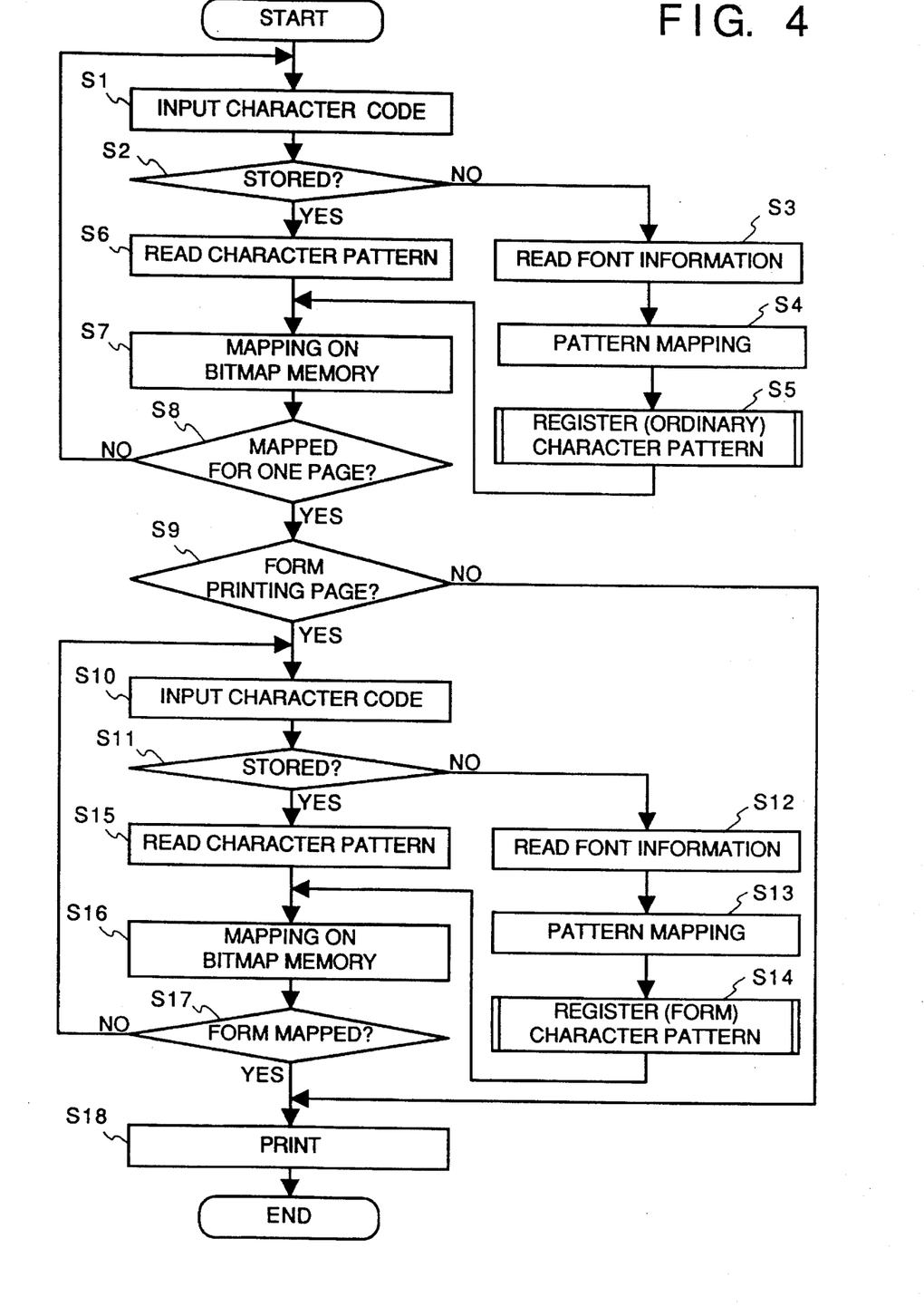
FIGS. 4, 5 and 6 are flowcharts showing overlaying image formation and printing performed by a CPU 101 according to the embodiment.
Figure 5:
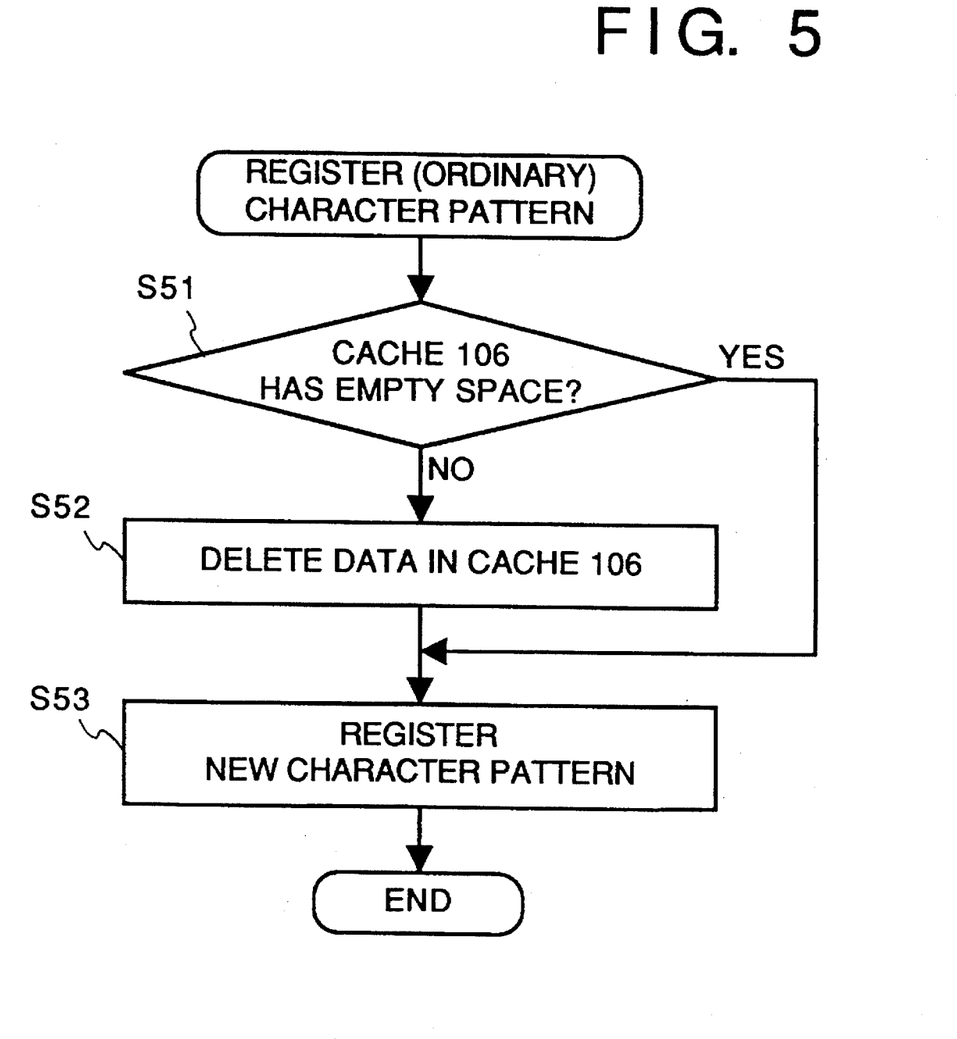
Figure 6:
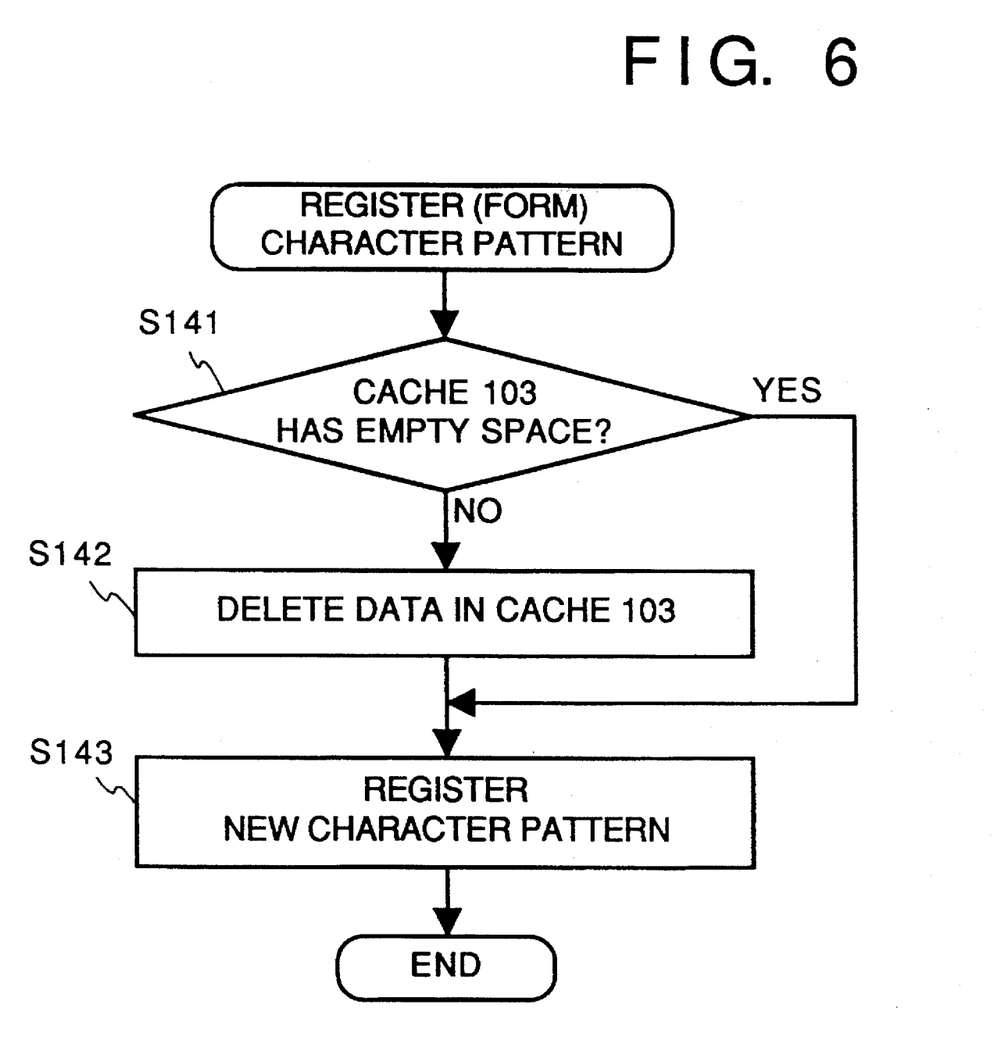

FIGS. 4 to 6 are flowcharts showing printing processing by the CPU 101 when an image data is formed by overlaying an ordinary character data, such as the data 202, on a form data, such as the data 201, and the formed image data is outputted.

Data from the host computer 100 received in parallel with the overlaying image formation and printing is stored in the page buffer memory 104 via the reception buffer 108. The processing of the flowcharts of FIGS. 4 to 6 start when printing data for one page is received and stored in the page buffer memory 104. It should be assumed that the form data 201 on each page, which will be overlaid, has been registered and stored in the RAM 101b in advance.

The outline of the image formation by overlaying an ordinary character data on a form data and printing output will be described below with reference to the flowchart of FIG. 4.

First, data for one character is read out of the page buffer memory 104 in step S1. Next, registered characters in the cache memory 106 for ordinary character data are searched to examine whether the character data read out in step S1 is stored or not in step S2.

If NO in step S2, i.e., it is determined that the character data is not stored, outline data corresponding to the character code is read out of the font memory 102 in step S3, and the character pattern is generated based on the read outline data in step S4.

Thereafter, the character pattern is registered in the cache memory 106 in step S5.

On the other hand, if YES in step S2, i.e., it is determined that the character data is stored, a corresponding character pattern is read out of the cache memory 106 in step S6.

The obtained character pattern is mapped on the bitmap memory 105 in step S7.

In step S8, examination is made as to whether bitmapping of character patterns for one page is completed or not and the operations in steps S1 to S7 are repeated until it is determined that the bitmapping of character patterns for one page is completed. On the other hand, if it is determined that the bitmapping of character patterns for one page is completed, the process proceeds to steps S9. In step S9, whether the bitmapped data is a page specified to be overlaid on the pre-registered form data is examined.

If YES in step S9, data for one character is read out of the form data which has been received from the host computer 300 and stored in the RAM 101b via the reception buffer 108 in advance in step S10. In step S11, registered characters in the cache memory 103 for form character data are searched to examine whether the read character data is stored or not.

If NO in step S11, an outline data corresponding to the character data is read out of the font memory 102 in step S12. In step S13, a character pattern is generated based on the outline data and outputted into the RAM 101b, and the character pattern is registered in the cache memory 103 in step S14.

If YES in step S11, the corresponding character pattern is read out of the cache memory 103 in step S15.

The obtained character pattern corresponding to the character data is mapped on the bitmap memory 105 in step S16. In step S17, whether the bitmapping of form data is completed or not is examined, and the operations in steps S10 to S16 are repeated until it is determined that the bitmapping of the form data is completed, at which time the process proceeds to step S18 to perform printing output.

In step S9, if it is determined that the bitmapped data is not a page specified to be overlaid on the form data, the process proceeds to step S18, in which the image data in the bitmap memory 105 is outputted into the printer engine 107 to perform printing output.

Next, the ordinary character pattern registration in step S5 will be described in detail with reference to the flowchart of FIG. 5, as well as description of the form character pattern registration in step S14 shown in the flowchart of FIG. 6.

In the registration of step S5, whether the cache memory has an empty space is examined before the pattern for one character is stored in the cache memory 106 in step S51. If NO, the least probable accessed data (=low priority data) is deleted from the pattern data pre-stored in the cache memory 106 in step S52. Access frequency of each pattern data is predicted based on such as the number of accesses and time elapsed from the previous access. In this manner, an empty space is ensured in the cache memory 106, then in step S53, the new character pattern is registered at the space.

It should be noted that the flowchart of FIG. 6 explaining the registration in step S14 corresponds to the flowchart of FIG. 5 except that the cache memory employed in the registration is the cache memory 103 for form character patterns, therefore, the explanation of the flowchart of FIG. 6 will be omitted.

The printing output in step S18 is performed in the printer engine 107 (laser-beam printer hereinafter abbreviated to "LBP") shown in FIG. 7.

Figure 7:
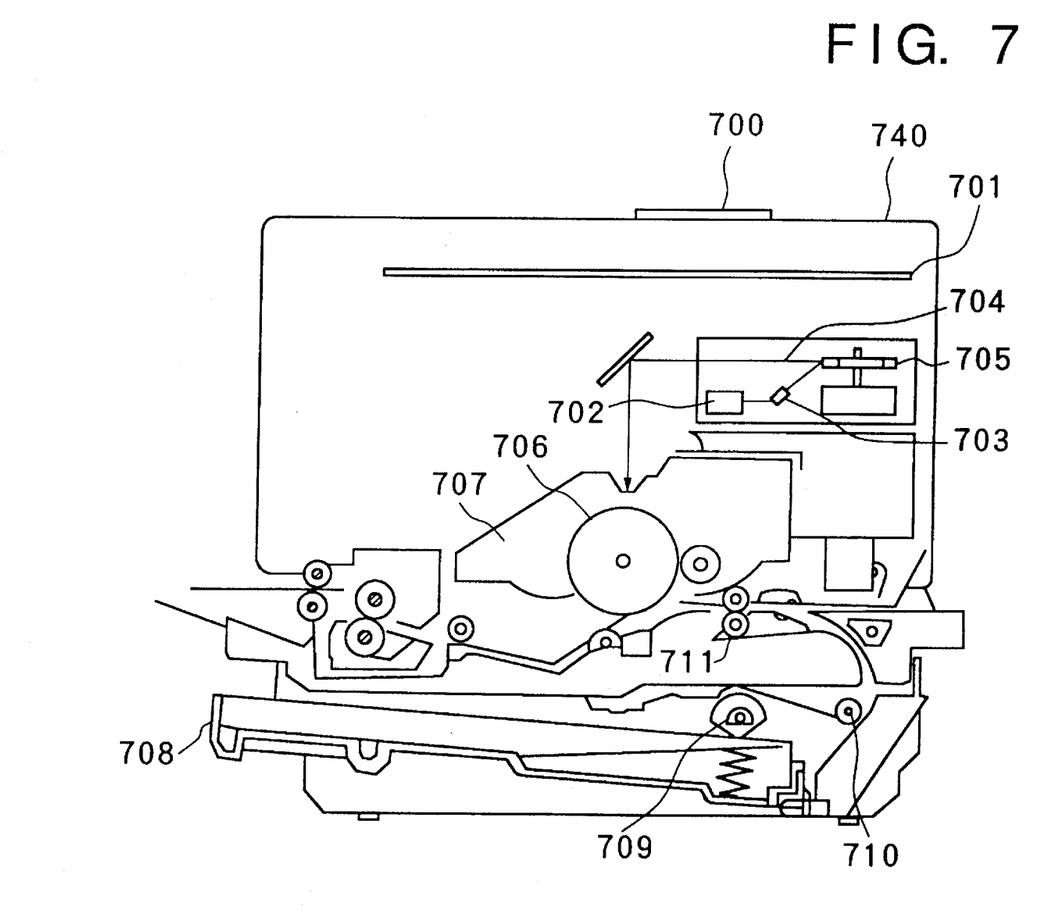
FIG. 7 is a cross-sectional view showing the structure of the printing apparatus in FIG. 1.

FIG. 7 is a sectional view showing the internal structure of a printer, containing the printer engine 107.

In FIG. 7, numeral 740 denotes a LBP main body which forms an image on a recording sheet as a recording medium, based on character patterns and the like supplied from the host computer 300; 700, a control panel on which various operating switches and LED (light emitting diode) displays and the like are arranged; and 701, a printer control unit for performing overall control of the LBP 740 and for analyzing data supplied from the host computer 300. The main unit 100 excluding the printer engine 107 shown in FIG. 1 is contained in the printing control unit 701.

A laser driver 702 is a circuit for driving a semiconductor laser unit 703. The laser driver 702 turns a laser beam 704 emitted from the semiconductor laser unit 703 to be on/off in accordance with the inputted video signal. A rotatable polygonal mirror 705 reflects the laser beam 704 in a left-right direction so that the laser beam 704 scans on an electrostatic drum 706.

In this way, an electrostatic latent image such as a character pattern is formed on the electrostatic drum 706. A developing unit 707 arranged around the electrostatic drum 706 develops the latent image and transfer the image onto a recording sheet. The recording sheet is a cut-sheet type recording sheet set in a cassette 708 attached to the LBP 740. A paper feeding roller 709, document feeding rollers 710 and 711 convey the sheet into the LBP 740 and supply the sheet to the electrostatic drum 706.

In this manner, the given printing data is outputted on the recording sheet.

According to the embodiment, upon overlaying an ordinary character data on a form data and outputting the overlaid image data, cache memories separated and respectively dedicated for ordinary character data and character data for form is employed. When the cache memory 106 has no empty space for ordinary character registration, space should be created by deleting character data from the lowest priority data; this arrangement can prevent deletions of characters used for the form from the cache memory 103.

Similarly, the arrangement can prevent deletions of ordinary characters from the cache memory 103 when it is out of empty space for character registration.

In this embodiment, the size of each cache memory space is not specified and it can be freely set. For example, when the cache memory 103 runs out of empty space, deletion can be performed from a character which has a mapping time of the shortest period, thus utilizing the cache memory effectively.

Upon search of a registered character pattern, if the character pattern is a character for form, the cache as the object of the search is the cache memory 103, while the object cache is the cache memory 106 if the character pattern is an ordinary character. However, it can be arranged such that both cache memories are searched.

It should be noted that the electrophotographic type printer is employed in this embodiment, however, the recording method is not taken into account as far as the printer uses an outline font. Further, the process described in the embodiment can be applied to a case where image output is not printing output.

In the embodiment, the two cache memories respectively have a fixed size. However, the present invention is not limited to this arrangement. For example, it can be arranged, as described in FIG. 8, such that the sum of the memory sizes of the two cache memories is fixed and the ratio of the respective memory sizes is variable.

Figure 8:
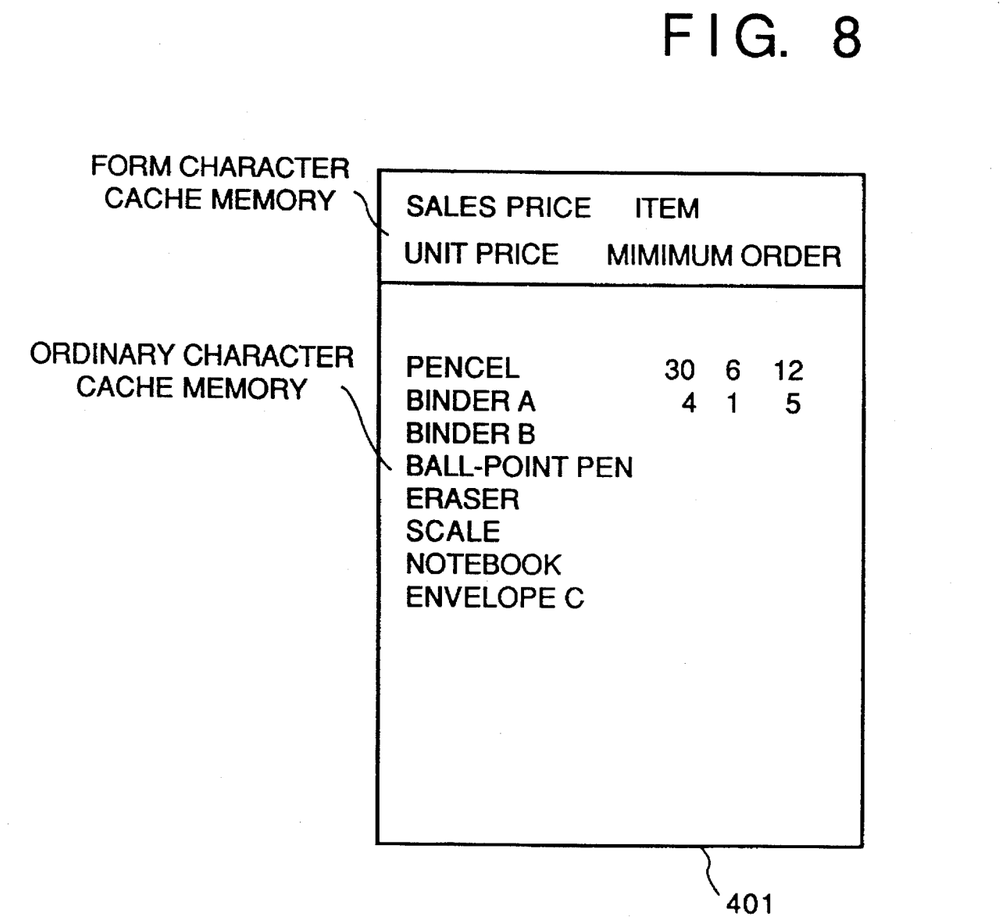
FIG. 8 is a diagram showing data stored in a cache memory having another structure.

FIG. 8 illustrates a font cache memory 401 including a form character cache memory area and an ordinary character cache memory area. The sum of the two memory areas is constant and the sizes of respective areas are variable. In FIG. 8, data in FIG. 2A are employed as form characters and data in FIG. 2B are employed as ordinary characters overlaid on the form 201 in FIG. 2A. As for cache allocation, the form character cache memory area is reserved for the amount of the form character data at form printing starting time, and the other part of the memory 401 is allocated as an ordinary character cache memory area, and upon completion of the form printing or deletion of the form, the reserved area is released, thus effectively utilizing the memory.

Furthermore, it can be arranged such that the form character cache memory area is reserved and released at each form printing to utilize the memory more effectively. When a plurality of forms are registered or printed, a cache memory area can be reserved at each recording starting time, and it can be released at each completion of form printing or each deletion of form.

Figure 9:
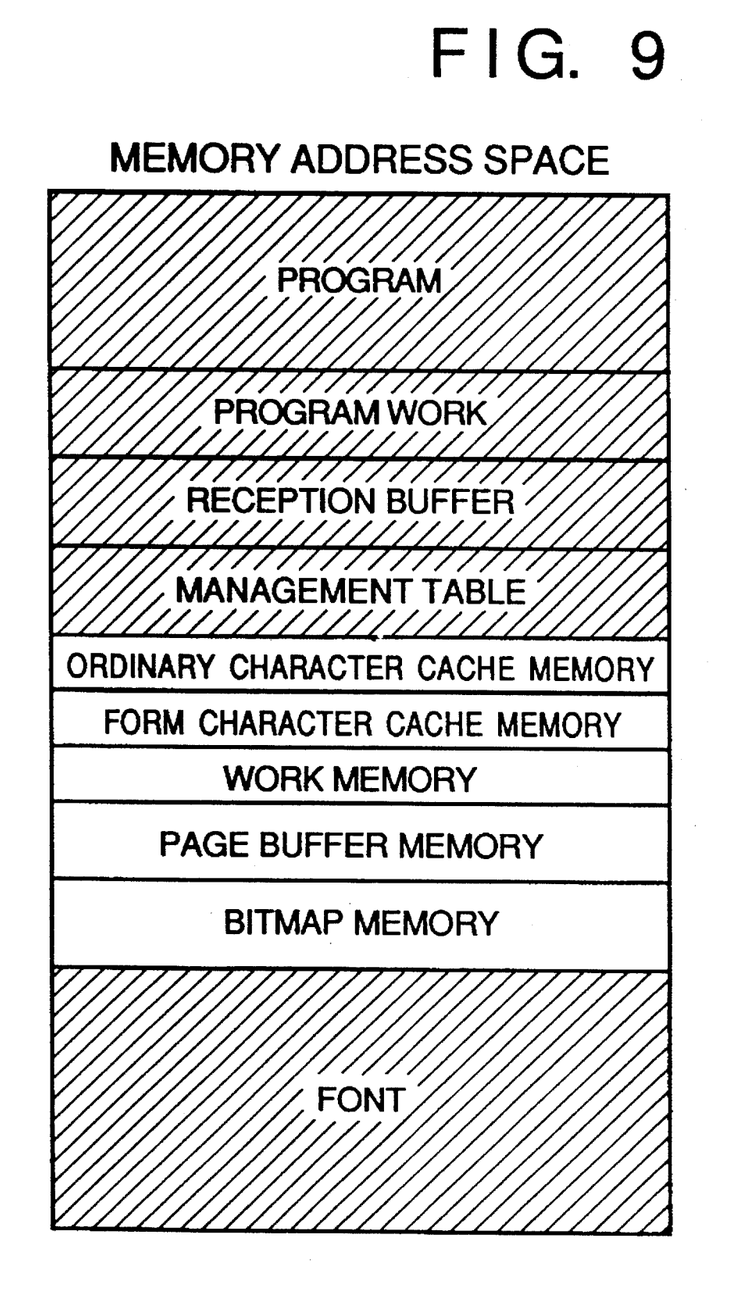
FIG. 9 is a diagram showing a memory address space employed for memory allocation, both static and dynamic memories.

It is also possible to dynamically allocate memory spaces in dependence upon the amount of ordinary character data and that of form character data as for allocation of ordinary character cache memory area and form character cache memory area. FIG. 9 illustrates a memory address space used for static memory allocation and dynamic memory allocation. In FIG. 9, the hatched portion includes areas respectively having a fixed area size, i.e., a program storage area, a program work area, a reception buffer, a management table and a font storage area. These areas are allocated at initializing time of the apparatus. The other portion includes areas dynamically allocated in accordance with necessities, i.e., a bitmap memory, a page buffer memory, a work memory, an ordinary character cache memory area and a form character cache memory area.

According to this arrangement employing dynamically allocated areas, if the size of a recording sheet is small, the bitmap memory size can be small, which allows larger size allocation for the other memory spaces. Accordingly, an ordinary character cache memory area and form character cache memory area for large sized character data can be ensured for registration of more character patterns. Further, it can be arranged such that priorities of the areas to be dynamically allocated are set in advance, and if an empty memory area is insufficient, necessary memory size is deleted from the lowest priority area, e.g., the ordinary character cache memory area, and the deleted memory size is re-allocated to an area requiring the memory size. As described in the embodiment, the deletion is started from the area in which data of the lowest access frequency is stored. Note that it is possible to set the largest memory size and the smallest memory size with respect to each area for preventing deletion of important data or for effective utilization of memory.

The present invention can be applied to a system constituted by a plurality of devices, or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. An image processing method of forming a new image by overlaying an image based on inputted data on a standardized form image which has been pre-registered, comprising:
    an input step of inputting data corresponding to the image overlaid on the form;
    a first discrimination step of discriminating whether or not pattern data corresponding to the data inputted in said input step is stored in a first area of a storage medium;
    a first mapping step of mapping the input data in the first area using an outline font based on the discrimination result in said first discrimination step;
    a second discrimination step of discriminating whether or not the pattern data included in the form is stored in a second area of the storage medium;
    a second mapping step of mapping the form in the second area using an outline font based on the discrimination result in said second discrimination step;
    a third mapping step of bitmapping the patterns mapped in said first and second mapping steps in a bitmap memory; and
    an output step of outputting the bitmapped pattern.

2. The method according to claim 1, wherein, in said first discrimination step, if the pattern data corresponding to the input data is not stored in the first area, examination is made as to whether or not the first area has an empty area, and if the empty area is insufficient, appropriate deletable data is deleted form pattern data pre-stored in the first area to ensure an empty area.

3. The method according to claim 2, wherein the appropriate deletable data is data of the lowest access frequency.

4. The method according to claim 1, wherein, in said second discrimination step, if the pattern data corresponding to the form is not stored in the second area, examination is made as to whether or not the second area, and if the empty area is insufficient, appropriate deletable data is deleted form pattern data pre-stored in the second area to ensure an empty area.

5. The method according to claim 4, wherein the appropriate deletable data is data of the lowest access frequency.

6. An image processing apparatus having a facility of forming a new image by overlaying an image based on inputted data on a standardized form, which has been pre-registered, comprising:
    forming means for forming pattern data corresponding to code data included in the input data and the form using an outline font;
    first memory means for storing the pattern data corresponding to the code data included in the input data;
    first discrimination means for discriminating whether or not the pattern data corresponding to the code data included in the input data is stored in said first memory means;
    second memory means for storing the pattern data corresponding to the code data included in the form;
    second discrimination means for discriminating whether or not the pattern data corresponding to the code data included in the form is stored in said second memory means; and
    image forming means for forming an image using the pattern data.

7. The apparatus according to claim 6, further comprising third memory means for storing the outline font.

8. The apparatus according to claim 6, wherein said first discrimination means includes:
    first empty area discrimination means for, if said first discrimination means discriminates that the pattern data corresponding to the input data is not stored in said first memory means, examining whether or not said first memory means has an empty area sufficient for newly storing the pattern data; and
    first deletion means for deleting the most appropriate deletable data among data pre-stored in said first memory means to ensure an empty area based on the discrimination result by said first empty area discrimination means.

9. The apparatus according to claim 8, wherein the most appropriate deletable data is data of the lowest access frequency.

10. The apparatus according to claim 9, wherein the data of the lowest access frequency is determined based on a number of accesses within a predetermined time and/or time elapsed from the previous access.

11. The apparatus according to claim 6, wherein said second discrimination means includes:
    second empty area discrimination means for, if said second discrimination means discriminates that the pattern data corresponding to the input data is not stored in said second memory means, examining whether or not said second memory means has an empty area sufficient for newly storing the pattern data; and
    second deletion means for deleting the most appropriate deletable data among data pre-stored in said second memory means to ensure an empty area based on the discrimination result by said second empty area discrimination means.

12. The apparatus according to claim 11, wherein the most appropriate deletable data is data of the lowest access frequency.

13. The apparatus according to claim 12, wherein the data of the lowest access frequency is determined based on a number of accesses within a predetermined time and/or time elapsed from the previous access.

14. The apparatus according to claim 6, wherein said first memory means and second memory means use a storage medium having a fixed memory capacity to be divided in dependence upon respective necessary memory information amounts.

15. The apparatus according to claim 14, wherein, as far as the form is registered, the memory area required for said second memory means is ensured in said storage medium.

16. The apparatus according to claim 6, further comprising output means for print-outputting the image.

17. The apparatus according to claim 16, wherein said output means is an electrophotographic type printer.

18. The apparatus according to claim 6, wherein said first memory means and second memory means separately and dynamically allocate memory areas to a storage medium in dependence upon respective necessary memory information amounts.

19. The apparatus according to claim 18, wherein the respective memory areas have priorities, and if the storage medium does not have sufficient empty area for newly storing the pattern data, the memory areas are released from the lowest priority area.

20. The apparatus according to claim 6, wherein the sum of a memory size of said first memory means and a memory size of said second memory means is constant, and the ratio of the memory size of said first memory means to the memory size of said second memory means is variable.

21. The apparatus according to claim 6, further comprising ensure means for ensuring an area in said second memory means when formation of the form is started.

22. The apparatus according to claim 6, wherein said second memory means stores pattern data for each form.

23. The apparatus according to claim 6, wherein a memory size of said first memory means and a memory size of said second memory means are variable.

24. An image processing apparatus comprising:

first memory means for storing first character pattern data generated from first vector font data which corresponds to a character included in form pattern data, and second character pattern data generated from second vector font data which corresponds to another character included in image data to be overlaid on a form;

first discrimination means for discriminating whether or not the first character pattern data is stored in said first memory means for form pattern data generation; and first generation means for generating the form pattern data based on the first character pattern data either stored in said first memory means or to be generated from the first vector font data in accordance with the discrimination result provided by said first discrimination means, wherein said first memory means stores the first and second character patterns in such a manner that the first and second character patterns are respectively identifiable.

25. The apparatus according to claim 24, further comprising:

input means for inputting first data for the form pattern data generation and second data for the image data generation from a host computer; and second memory means for storing the first and second data.

26. The apparatus according to claim 24, further comprising:

second discrimination means for discriminating whether or not the second character pattern data is stored in said first memory means for the image data generation;

second generation means for generating the image data based on the second character pattern data either stored in said first memory means or to be generated from the second vector font data in accordance with the discrimination result provided by said second discrimination means; and output means for overlaying the image data generated by said second generation means on the form pattern generated by said first generation means, and outputting the overlaid image.

27. The apparatus according to claim 24, wherein said first memory means stores the first and second character patterns in separate areas.

28. The apparatus according to claim 27, wherein the sum of a first area for the first character pattern data and a second area for the second character pattern data is constant, and the ratio of the first area to the second area is variable.

29. The apparatus according to claim 28, further comprising ensure means for ensuring the first area in said first memory means when a printing of a form image is started.

30. The apparatus according to claim 27, wherein said first memory means stores the first character pattern data for each form.

31. The apparatus according to claim 27, wherein a first area for the first character pattern data and a second area for the second character pattern data are variable.

32. The apparatus according to claim 26, wherein said output means comprises a printer which uses an electrophotographic method.

33. An image processing method comprising the steps of:

storing first character pattern data generated from first vector font data which corresponds to a character included in form pattern data, and second character pattern data generated from second vector font data which corresponds to another character included in image data to be overlaid on a form, in a storage medium;

discriminating whether or not the first character pattern data is stored in the storage medium for the form pattern data generation; and generating the form pattern data based on the first character pattern data either stored in the storage medium or to be generated from the first vector font data in accordance with the discrimination result, wherein the first and second character patterns are stored in a respectively identifiable manner.

* * * * *

UNITED STATES PATENT AND TRADEMARK OFFICE
CERTIFICATE OF CORRECTION

PATENT NO. : 5,587,800
DATED : December 24, 1996
INVENTOR : YUKI MIYAZAKI

It is certified that error appears in the above-identified patent and that said Letters Patent is hereby corrected as shown below:

ON TITLE PAGE ITEM:

[63] Related U.S. Application Data

"Continuation-in-part" should read --Continuation--.

IN THE DRAWINGS

Sheet 8 of 10, Fig. 8 "PENCEL" should read --PENCIL--.

COLUMN 1

Line 14, Delete "a";
Line 15, "font" should read --fonts--;
Line 47, "patten" should read --pattern--.

COLUMN 2

Line 13, "made" should read --made as--.

COLUMN 3

Line 2, "invent ion." should read --invention.--;
Line 59, "numeral" should read --numerals--.

COLUMN 5

Line 50, "transfer" should read --transfers--;
Line 63, "is" should read --are--.

UNITED STATES PATENT AND TRADEMARK OFFICE
CERTIFICATE OF CORRECTION

PATENT NO. : 5,587,800

DATED : December 24, 1996

INVENTOR : YUKI MIYAZAKI

It is certified that error appears in the above-identified patent and that said Letters Patent is hereby corrected as shown below:

<u>COLUMN 7</u>

```
Line  9, "re-allocated" should read --reallocated--;
Line 55, "form" should read --from--;
Line 62, "area," should read --area has an empty area--;
Line 63, "form" should read --from--.
```

Signed and Sealed this

Ninth Day of September, 1997

Attest:

Attesting Officer

BRUCE LEHMAN

Commissioner of Patents and Trademarks